US009976500B2

(12) United States Patent
McConville

(10) Patent No.: US 9,976,500 B2
(45) Date of Patent: *May 22, 2018

(54) METHOD AND SYSTEM FOR SELECTIVE CYLINDER DEACTIVATION

(71) Applicant: Ford Global Technologies, LLC, Dearborn, MI (US)

(72) Inventor: Gregory Patrick McConville, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 105 days.

This patent is subject to a terminal disclaimer.

(21) Appl. No.: 14/849,218

(22) Filed: Sep. 9, 2015

(65) Prior Publication Data

US 2016/0108834 A1 Apr. 21, 2016

Related U.S. Application Data

(60) Provisional application No. 62/066,258, filed on Oct. 20, 2014.

(51) Int. Cl.
*F01L 1/34* (2006.01)
*F02D 41/00* (2006.01)
*F02D 13/02* (2006.01)
*F02D 13/06* (2006.01)

(52) U.S. Cl.
CPC ..... *F02D 41/0087* (2013.01); *F02D 13/0219* (2013.01); *F02D 13/06* (2013.01); *F02D 2041/001* (2013.01); *F02D 2041/0012* (2013.01); *Y02T 10/18* (2013.01)

(58) Field of Classification Search
CPC .. F02D 41/0087; F02D 13/06; F02D 13/0219; F02D 2041/001; F02D 2041/0012
USPC ............................................ 123/90.15, 90.17
See application file for complete search history.

(56) References Cited

U.S. PATENT DOCUMENTS

| | | | |
|---|---|---|---|
| 5,467,748 A | 11/1995 | Stockhausen | |
| 5,934,263 A | 8/1999 | Russ et al. | |
| 6,499,449 B2 | 12/2002 | Michelini et al. | |
| 6,688,272 B2 | 2/2004 | Brevick et al. | |
| 6,817,336 B2 * | 11/2004 | Glugla | F02B 75/22 123/198 F |
| 7,210,454 B2 | 5/2007 | Maehara et al. | |
| 7,673,601 B2 | 3/2010 | Spath et al. | |
| 7,861,682 B2 | 1/2011 | Berger | |
| 8,042,504 B2 | 10/2011 | Berger | |
| 8,145,410 B2 | 3/2012 | Berger et al. | |
| 8,651,091 B2 | 2/2014 | Tripathi et al. | |

(Continued)

*Primary Examiner* — Ching Chang
(74) *Attorney, Agent, or Firm* — Julia Voutyras; McCoy Russell LLP

(57) ABSTRACT

Methods and systems are provided for adjusting a cylinder deactivation pattern to improve camshaft phasing. In response to a request for actuating a camshaft phaser of a variable cam timing device, a cylinder deactivation pattern is adjusted by reactivating cylinders that were deactivated while deactivating other cylinders that were active, while maintaining a total number of deactivated/active cylinders. Cylinders are selected for reactivation or deactivation based on their individual camshaft torsion signatures so that sufficient cam torque is generated to actuate the phaser and provide the requested phasing.

16 Claims, 8 Drawing Sheets

(56) References Cited

U.S. PATENT DOCUMENTS

| | | | |
|---|---|---|---|
| 9,605,601 B2 * | 3/2017 | Leone | F02D 17/02 |
| | | | 123/434 |
| 9,677,479 B2 * | 6/2017 | Boyer | F02B 75/20 |
| | | | 123/90.15 |
| 2010/0050993 A1 | 3/2010 | Zhao et al. | |

* cited by examiner

METHOD AND SYSTEM FOR SELECTIVE CYLINDER DEACTIVATION

CROSS REFERENCE TO RELATED APPLICATIONS

The present application claims priority to U.S. Provisional Patent Application No. 62/066,258, entitled "METHOD AND SYSTEM FOR SELECTIVE CYLINDER DEACTIVATION," filed Oct. 20, 2014, the entire contents of which are hereby incorporated by reference for all purposes.

FIELD

The present application relates to methods and system for selectively deactivating individual engine cylinders in an engine configured with variable cam timing (VCT).

BACKGROUND AND SUMMARY

Engines may be configured to operate with a variable number of active or deactivated cylinders to increase fuel economy, while optionally maintaining the overall exhaust mixture air-fuel ratio about stoichiometry. Therein, a portion of an engine's cylinders may be disabled during selected conditions defined by parameters such as a speed/load window, as well as various other operating conditions including vehicle speed. An engine control system may disable a selected group of cylinders, such as a bank of cylinders, through the control of a plurality of cylinder valve deactivators that affect the operation of the cylinder's intake and exhaust valves, and through the control of a plurality of selectively deactivatable fuel injectors that affect cylinder fueling.

Further improvements in fuel economy can be achieved in engines configured to vary the effective displacement of the engine by skipping the delivery of air and fuel to certain cylinders in an indexed cylinder firing pattern, also referred to as a "skip-fire" pattern. One example of a skip-fire engine is shown by Tripathi et al. in U.S. Pat. No. 8,651,091. Therein, an engine controller may continuously rotate which particular cylinders receive air and fuel, which cylinders are skipped, and how many cylinders events the pattern is continued for. By skipping air and fuel deliver to selected cylinders, the active cylinders can be operated near their optimum efficiency, increasing the overall operating efficiency of the engine. By varying the identity and number of cylinders skipped, a large range of engine displacement options may be possible.

However the inventors herein have identified a potential issue with such engine systems. In engine systems that are also configured with variable cam timing (VCT) devices for varying the valve timing of individual cylinders, deactivation of selected cylinders may result in camshaft torque pulses that degrade camshaft phasing. As such, VCT devices may include a vane type cam phaser that is cam torque actuated wherein the actuation of the phaser is dependent on torque generated during cam actuation. Specifically, the torque that the camshaft imparts on the camshaft phaser at any engine angle is determined as a function of the torques imparted on the camshaft from each valve-train member in contact with the camshaft. In engines with the ability to deactivate any number of cylinders, the camshaft torsional signature may vary depending on which cylinders are actively opening and closing valves on a given engine cycle. Since the camshaft phaser depends on the torsional input as the energy source for advancing or retarding the cam phasing, the phaser's ability to phase could be diminished if the torsional signature resulting from the selected cylinder deactivation pattern contains fewer peaks per cycle, or lower amplitude peaks. The inventors have recognized that for a given number of deactivated cylinders, there may be some sets of deactivated cylinders that are able to support engine load requirements, but may not be able to provide sufficient torsional loads capable of phasing the camshafts. As a result, the camshaft phasing ability of the engine may be reduced, degrading engine performance.

In one example, the above issue may be at least partly addressed by a method for an engine comprising: deactivating an individual cylinder valve mechanism according to a cylinder pattern; and reactivating the valve mechanism in response to a request for cam phasing. In this way, cylinder deactivation patterns may be adjusted in the presence of a phasing requirement to allow for improved camshaft phasing.

For example, in response to a drop in engine load, an engine controller may select a cylinder deactivation pattern. The pattern may include a total number of individual cylinder valve mechanisms to be deactivated relative to a total number of active cylinders. The number and identity of cylinders selected for deactivation may be based on the change (that is, drop) in engine load. The individual cylinder valve mechanisms may then be deactivated according to the determined pattern. In response to a cam phasing request, that is a request for advancing or retarding cam timing, the engine controller may reactivate one or more of the deactivated cylinders. In addition, the controller may deactivate one or more of the active cylinders so as to maintain the total number of deactivated/active cylinders constant while adjusting the cylinder deactivation pattern. For example, the controller may compare the camshaft torsion signatures of the different cylinder patterns to identify a pattern with a set of deactivated cylinders that is more favorable for camshaft phasing. As such, for a given total number of deactivated cylinders, there may be a combination of cylinders (based on their identity, firing order, location on engine block, etc.) having a cam torque signature that is more favorable for cam phasing while other combinations are less favorable. For example, the amplitude and position of torsion peaks for each (active) cylinder in an unfavorable cylinder pattern may result in less net energy to phase the camshaft. In comparison, the amplitude and position of torsion peaks for each (active) cylinder in a favorable cylinder pattern may result in more net energy to phase the camshaft. The controller may reactivate deactivated cylinders and/or deactivate active cylinders of the originally selected cylinder pattern to provide the cylinder deactivation pattern that is more conducive for camshaft phasing. Once the camshaft phasing is completed, the controller may adjust cylinder valve deactivation mechanisms to resume the original cylinder pattern (or an alternate pattern based on the current engine load).

In this way, camshaft phasing efficiency may be improved while operating with one or more deactivated engine cylinders. By deactivating and/or reactivating engine cylinders while taking into account the torques imparted on the camshaft from each valve of the engine cylinders, the total energy delivered to the camshaft can be improved. By providing improved torsional load from cylinder valves onto the camshaft while deactivating selected individual cylinder valve mechanisms, the energy for phasing a camshaft is improved. By improving camshaft phasing, cam timing adjustments are better enabled, improving engine performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
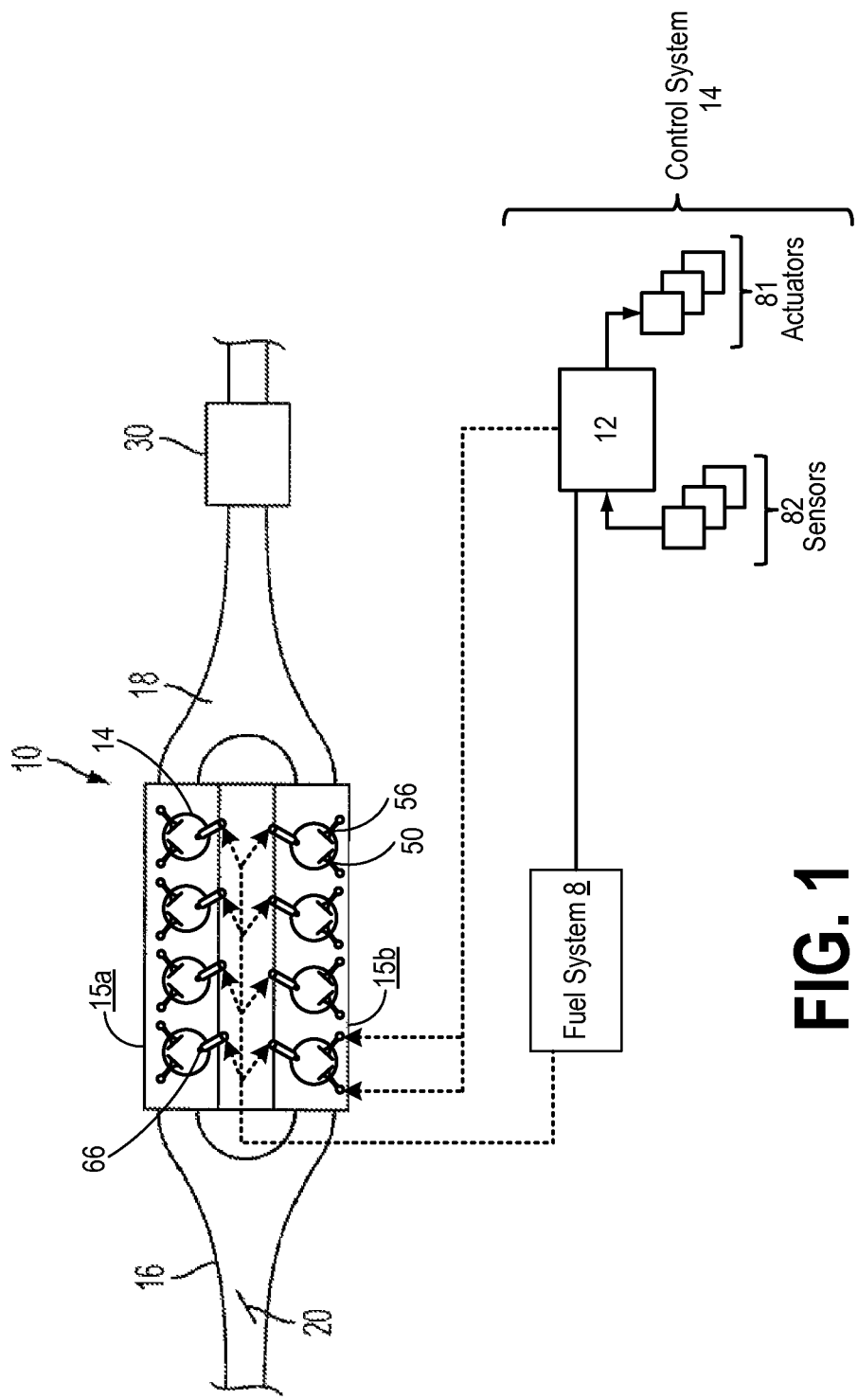
FIG. 1 shows an example embodiment of an engine system layout.
Figure 2:
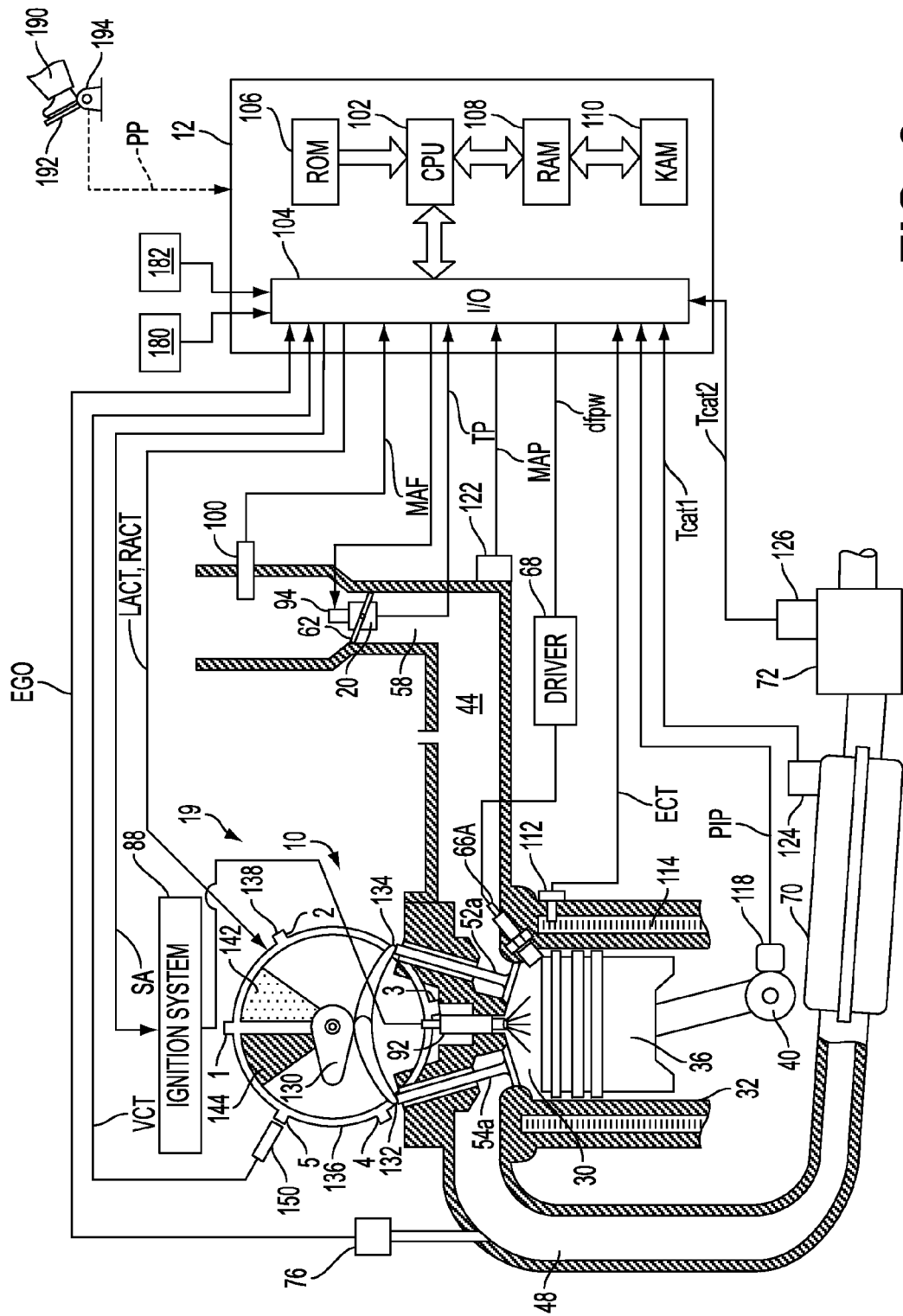
FIG. 2 shows a partial engine view.
Figure 3:
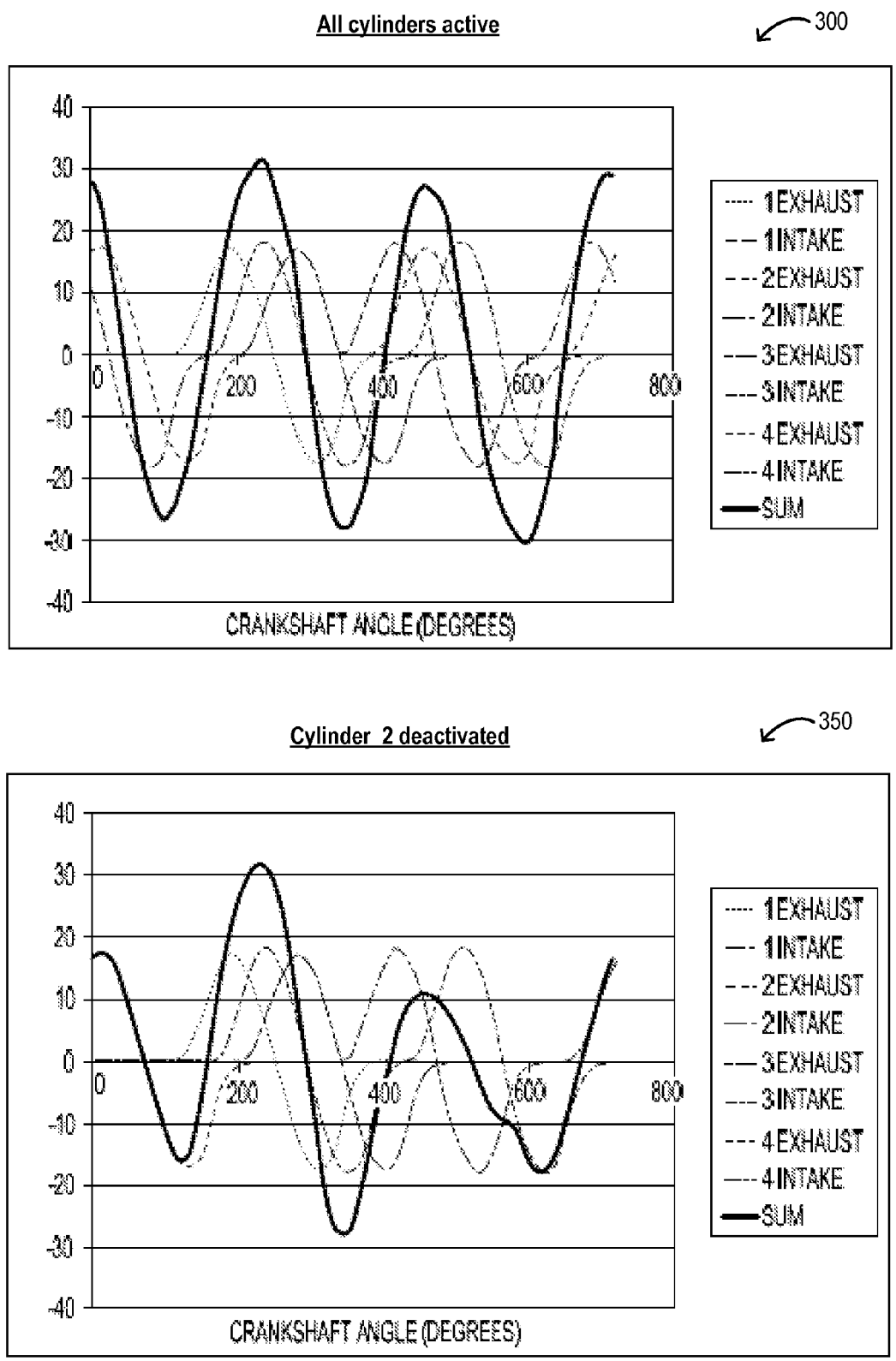
FIGS. 3-5 show example torque signatures for various cylinder deactivation patterns in a V8 engine.
Figure 4:
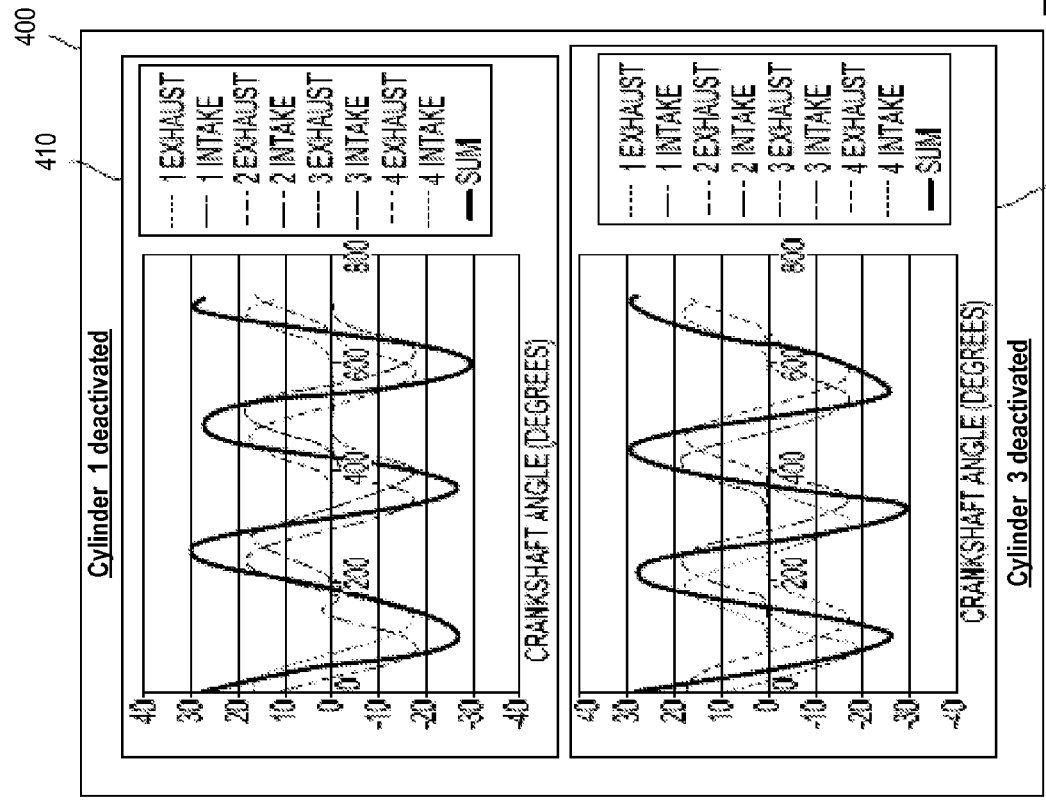
Figure 4:
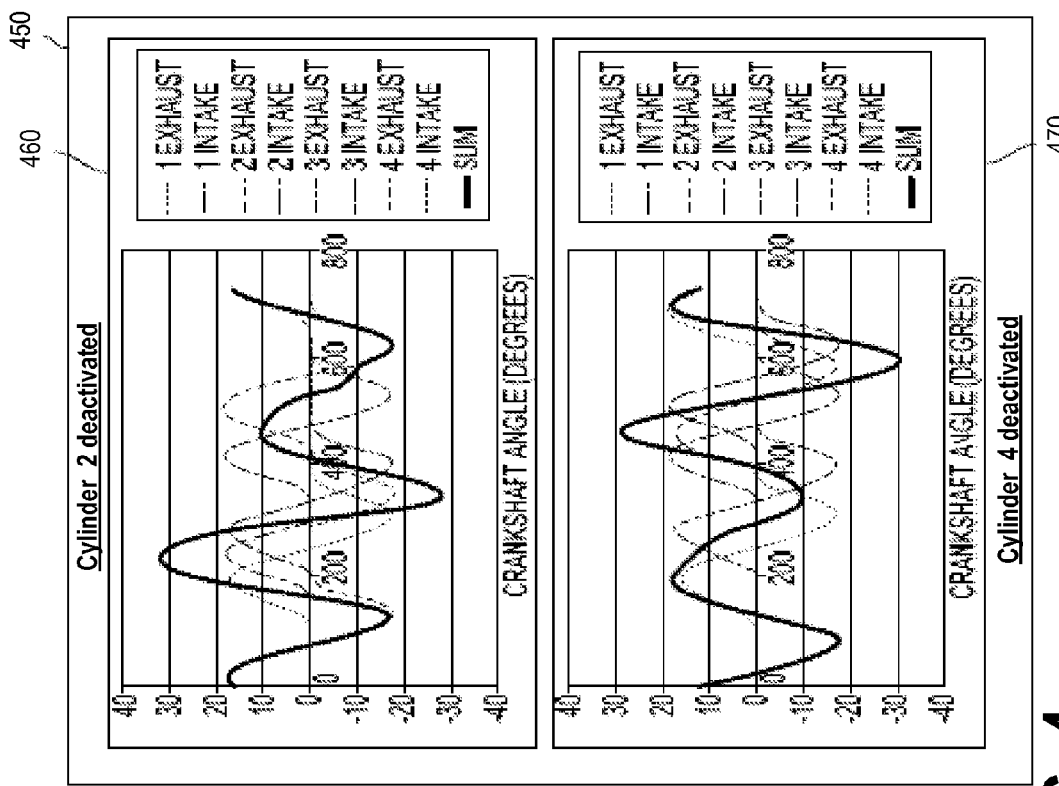
Figure 5:
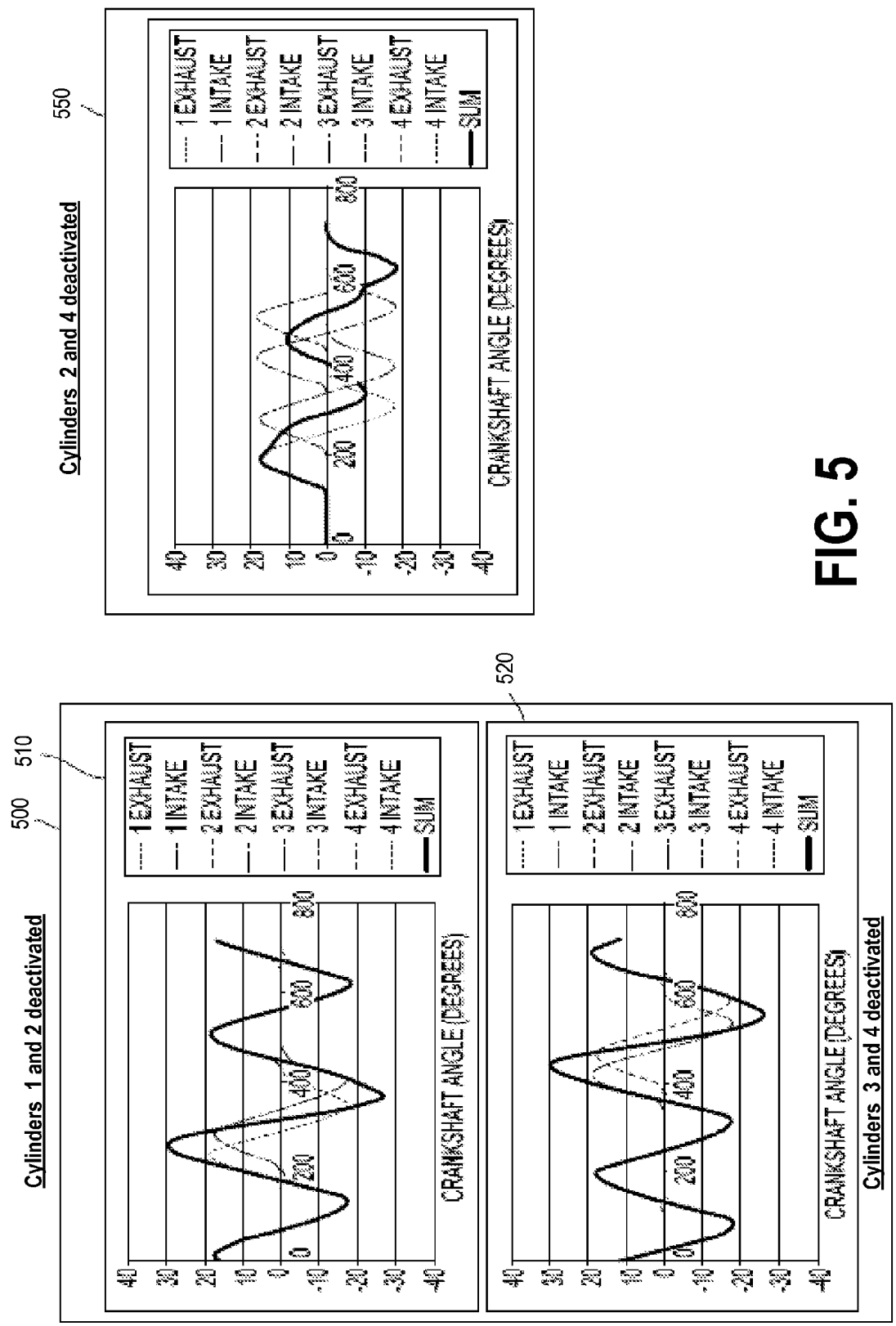
Figure 7:
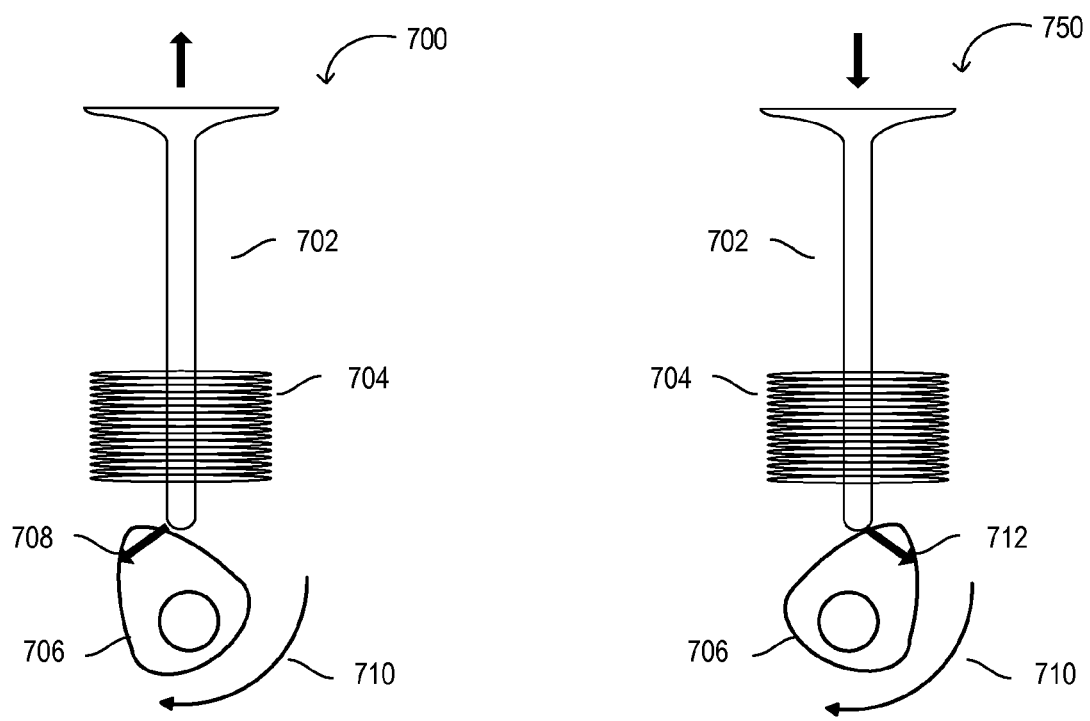
FIG. 7 depicts the effect of torsional pulses on camshaft phaser motion.
Figure 8:
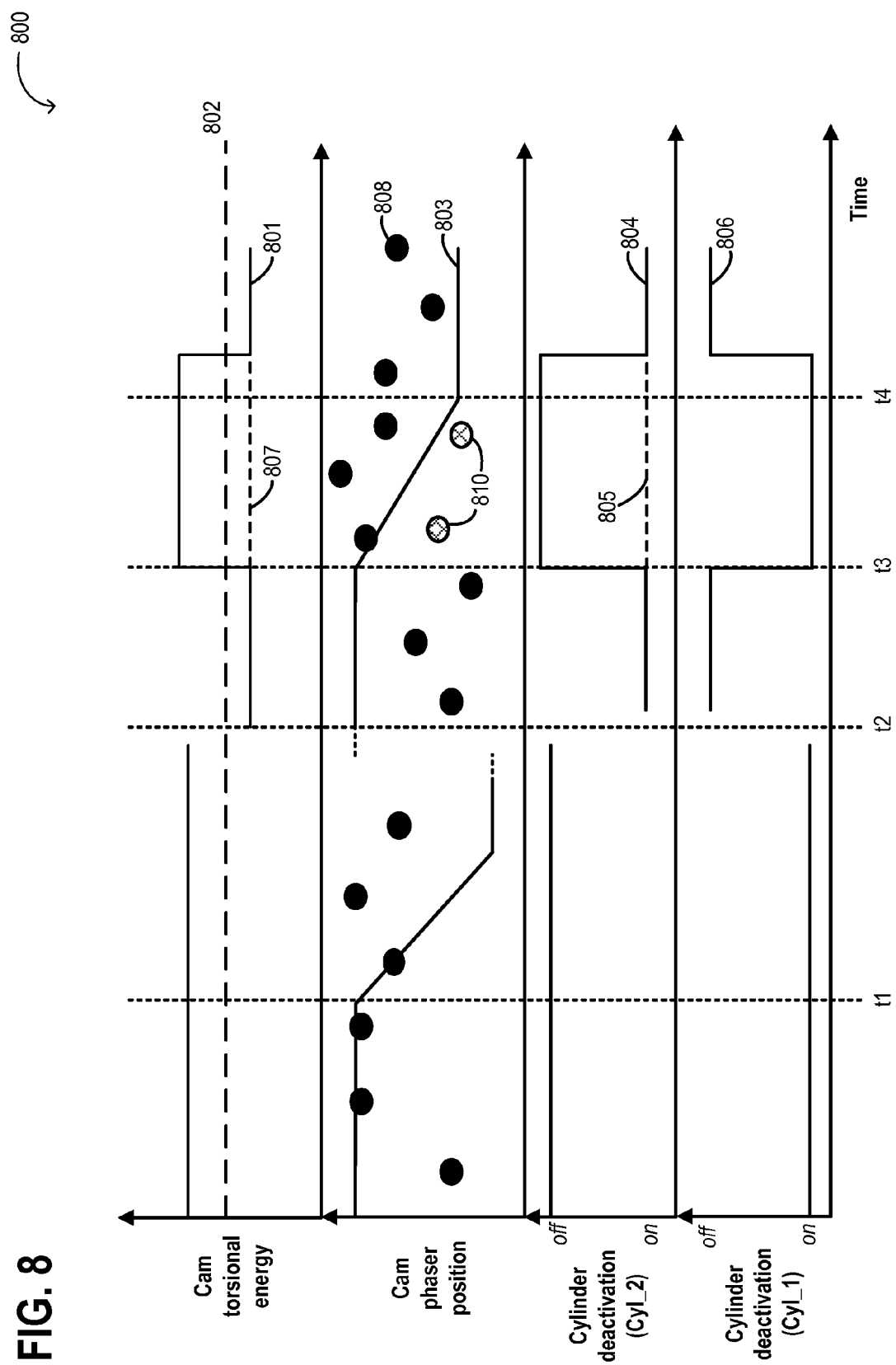
FIG. 8 shows an example of adjusting operation of individual cylinder valve mechanisms to improve torsional input from active cylinder valves on a camshaft to enable phasing.

Methods and systems are provided for adjusting individual cylinder valve mechanisms for an engine configured for selective cylinder deactivation (herein also referred to as skip-fire operation), such as the engine system of FIGS. 1-2, responsive to a phasing request. A controller may adjust the skip-firing pattern selected responsive to cylinder deactivation conditions responsive to a cam phasing request. A controller may be configured to perform a routine, such as the routine of FIG. 6, to reactivate a previously deactivated cylinder in response to a request for cam timing advance/retard to increase the torsional load from the active cylinder valves on the camshaft (FIG. 7). A cylinder may be selected for reactivation based on the camshaft torsional signature of each cylinder pattern (FIGS. 3-5). The controller may also concurrently reactivate one or more other cylinders to allow the engine to continue operating with cylinder deactivation benefits. An example adjustment that increases the net energy from valve torsions applied on the camshaft to enable improved phasing is shown at FIG. 8. In this way, camshaft phasing while operating an engine with a skip-fire pattern is improved.

FIG. 1 shows an example engine 10 having a first bank 15a and a second bank 15b. In the depicted example, engine 10 is a V8 engine with the first and second banks each having four cylinders. Engine 10 has an intake manifold 16, with throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

Engine system 10 may have cylinders 14 with selectively deactivatable intake valves 50 and selectively deactivatable exhaust valves 56. In one example, intake valves 50 and exhaust valves 56 are configured for cam actuation (as elaborated at FIG. 2) via individual cam-based cylinder valve actuators. Each engine bank could include one camshaft that actuates the intake and exhaust valves. In an alternate example, each engine bank could include one camshaft actuating intake valves and a separate camshaft actuating exhaust valves. In alternate examples, the valves may be configured for electric valve actuation (EVA) via electric individual cylinder valve actuators. While the depicted example shows each cylinder having a single intake valve and a single exhaust valve, in alternate examples, as elaborated at FIG. 2, each cylinder may have a plurality of selectively deactivatable intake valves and/or a plurality of selectively deactivatable exhaust valves.

During selected conditions, such as when the full torque capability of the engine is not needed, one or more cylinders of engine 10 may be selected for selective deactivation (herein also referred to as individual cylinder deactivation). This may include selectively deactivating one or more cylinders on only the first bank 15a, one or more cylinders on only the second bank 15b, or one or more cylinders on each of the first and second bank. The number and identity of cylinders deactivated on each bank may be symmetrical or asymmetrical.

During the deactivation, selected cylinders may be deactivated by closing the individual cylinder valve mechanisms, such as intake valve mechanisms, exhaust valve mechanisms, or a combination of both. Cylinder valves may be selectively deactivated via hydraulically actuated lifters (e.g., lifters coupled to valve pushrods), via a deactivating follower mechanism in which the cam lift following portion of the follower can be decoupled from the valve actuating portion of the follower, or via electrically actuated cylinder valve mechanisms coupled to each cylinder. In addition, fuel flow and spark to the deactivated cylinders may be stopped, such as by deactivating cylinder fuel injectors.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Cylinders may be deactivated to provide a specific firing (or skip-firing) pattern based on a designated control algorithm. More specifically, selected "skipped" working cycles are not fired while other "active" working cycles are fired. Optionally, a spark timing associated with a selected firing of a selected working chamber may also be adjusted based on a firing order or firing history of the selected working chamber. The engine controller 12 may be configured with suitable logic, as described below, for determining a cylinder deactivation (or skip-firing) pattern based on engine operating conditions.

Engine 10 may operate on a plurality of substances, which may be delivered via fuel system 8. Engine 10 may be controlled at least partially by a control system including controller 12. Controller 12 may receive various signals from sensors 82 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors. In addition, controller 12 may receive an indication of cylinder knock or pre-ignition from one or more knock sensors distributed along the engine block. When included, the plurality of knock sensors may be distributed symmetrically or asymmetrically along the engine block. Further, the one or more knock sensors may include accelerometers, ionization sensors or in-cylinder pressure transducers.

Engine controller may include a drive pulse generator and a sequencer for determining a cylinder pattern based on the desired engine output at the current engine operating conditions. For example, the drive pulse generator may use adaptive predictive control to dynamically calculate a drive pulse signal that indicates which cylinders are to be fired and at what intervals to obtain the desired output (that is, the cylinder firing/skip-firing pattern). The cylinder firing pattern may be adjusted to provide the desired output without generating excessive or inappropriate vibration within the engine. As such, the cylinder pattern may be selected based on the configuration of the engine, such as based on whether the engine is a V-engine, an in-line engine, the number of engine cylinders present in the engine, etc. Based on the selected cylinder pattern, the individual cylinder valve mechanisms of the selected cylinders may be closed while fuel flow and spark to the cylinders are stopped.

Since optimal efficiency for a given cylinder is near full output, a lower frequency of firing events may be chosen to reduce output. For example, skipping every other cylinder would produce half of the power, on average. Spacing the firing events out as evenly as possible tends to minimize vibrations due to the varying torque output. Whether all of the cylinders are included in the skip-firing pattern may depend on the fraction of output desired, and other considerations including cylinder temperature.

In this way, by adjusting the cylinder pattern of individual cylinder valve mechanisms and individual cylinder fuel injectors, a desired engine output can be provided by operating fewer cylinders more efficiently, thereby improving fuel economy.

As elaborated herein with reference to FIGS. 3-6, the controller may adjust the cylinder pattern in response to a request for camshaft phasing to allow for a cylinder pattern to be applied that is more favorable for camshaft phasing. This may include reactivating previously deactivated cylinders and/or deactivating previously active cylinders so as to adjust the torsional load from the cylinder valve events on the camshaft such that there is sufficient energy for phasing the camshaft.

FIG. 2 depicts an example embodiment of a combustion chamber or cylinder of internal combustion engine 10. FIG. 2 shows that engine 10 may receive control parameters from a control system including controller 12, as well as input from a vehicle operator 190 via an input device 192. In this example, input device 192 includes an accelerator pedal and a pedal position sensor 194 for generating a proportional pedal position signal PP.

Cylinder (herein also "combustion chamber") 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10. Crankshaft 40 is coupled to an oil pump (not shown) to pressurize an engine oil lubrication system. Housing 136 is hydraulically coupled to crankshaft 40 via a timing chain or belt (not shown).

Cylinder 30 can receive intake air via intake manifold or air passages 44. Intake air passage 44 can communicate with other cylinders of engine 10 in addition to cylinder 30. In some embodiments, one or more of the intake passages may include a boosting device such as a turbocharger or a supercharger. A throttle system including a throttle plate 62 may be provided along an intake passage of the engine for varying the flow rate and/or pressure of intake air provided to the engine cylinders. In this particular example, throttle plate 62 is coupled to electric motor 94 so that the position of throttle plate 62 is controlled by controller 12 via electric motor 94. This configuration may be referred to as electronic throttle control (ETC), which can also be utilized during idle speed control.

Combustion chamber 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Exhaust manifold 48 can receive exhaust gases from other cylinders of engine 10 in addition to cylinder 30. Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. Emission control device 72 is shown positioned downstream of catalytic converter 70. Emission control device 72 may be a three-way catalyst, a NOx trap, various other emission control devices or combinations thereof.

In some embodiments, each cylinder of engine 10 may include a spark plug 92 for initiating combustion. Ignition system 88 can provide an ignition spark to combustion chamber 30 via spark plug 92 in response to spark advance signal SA from controller 12, under select operating modes. However, in some embodiments, spark plug 92 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, fuel injector 66A is shown coupled directly to cylinder 30 for injecting fuel directly therein in proportion to the pulse width of signal dfpw received from controller 12 via electronic driver 68. In this manner, fuel injector 66A provides what is known as direct injection (hereafter also referred to as "DI") of fuel into cylinder 30. The fuel injector may be mounted in the side of the combustion chamber (as shown) or in the top of the combustion chamber (near the spark plug), for example. Fuel may be delivered to fuel injector 66A by a fuel system including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle 20; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 20; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

In this particular example, temperature $T_{cat1}$ of catalytic converter 70 is provided by temperature sensor 124 and temperature $T_{cat2}$ of emission control device 72 is provided by temperature sensor 126. In an alternate embodiment, temperature Tcat1 and temperature Tcat2 may be inferred from engine operation.

The controller 12 receives signals from the various sensors of FIGS. 1 and 2 and employs the various actuators of FIGS. 1 and 2 to adjust engine operation based on the received signals and instructions stored on a memory of the controller Continuing with FIG. 2, a variable camshaft timing (VCT) system 19 is shown. In this example, an overhead cam system is illustrated, although other approaches may be used Specifically, camshaft 130 of engine 10 is shown communicating with rocker arms 132 and 134 for actuating intake valves 52a, 52b and exhaust valves 54a, 54b. In the depicted example, VCT system 19 is cam-torque actuated (CTA), wherein actuation of a camshaft phaser of the VCT system is enabled via cam torque pulses. In alternate examples, VCT system 19 may be oil-pressure actuated (OPA). By adjusting a plurality of hydraulic valves to thereby direct a hydraulic fluid, such as engine oil, into the cavity (such as an advance chamber or a retard chamber) of a camshaft phaser, valve timing may be changed, that is advanced or retarded. As used herein, advance and retard of cam timing refer to relative cam timings, in that a fully advanced position may still provide a retarded intake valve opening with regard to top dead center, as just an example.

As such, when the engine is running, the torque that the camshaft imparts on the cam torque actuated camshaft phaser at any engine angle is determined as a function of the torques imparted on the camshaft from each valve-train member in contact with the camshaft. In the case of the skip-fire engine of the present disclosure, this includes the valve-train members of each active cylinder at any given time. As the engine controller selectively deactivates individual cylinder valve mechanisms, the camshaft torsional signature of the engine varies. That is, the camshaft torsional signature varies based on the total number and further based on the identity (e.g., position on engine block, firing order, bank-specific location, etc.) of the cylinders that are actively opening and closing intake and exhaust valves on any given engine cycle. As such, since the camshaft phaser depends on the torsional input as the energy source for advancing or retarding cam phasing (to vary cam timing), the ability to phase may become diminished when operating with selected cylinder deactivation patterns. For example, selected cylinder deactivation patterns may contain fewer peaks per cycle, and/or peaks of lower amplitude, as elaborated at FIGS. 3-5. As detailed herein with reference to FIG. 6, during a request for cam phasing, a controller may alter the cylinder deactivation pattern to improve the phasing response of the phaser. Therein, one or more deactivated cylinders may be reactivated and/or one or more active cylinders may be deactivated so as to generate a torsional signature with more peaks and/or with peaks of higher amplitude such that the net energy source to the phaser is improved. As such, this allows the phaser's response to be improved. An example adjustment is shown at FIG. 7.

Camshaft 130 is hydraulically coupled to housing 136. Housing 136 forms a toothed wheel having a plurality of teeth 138. In the example embodiment, housing 136 is mechanically coupled to crankshaft 40 via a timing chain or belt (not shown). Therefore, housing 136 and camshaft 130 rotate at a speed substantially equivalent to each other and synchronous to the crankshaft. In an alternate embodiment, as in a four stroke engine, for example, housing 136 and crankshaft 40 may be mechanically coupled to camshaft 130 such that housing 136 and crankshaft 40 may synchronously rotate at a speed different than camshaft 130 (e.g., a 2:1 ratio, where the crankshaft rotates at twice the speed of the camshaft). In the alternate embodiment, teeth 138 may be mechanically coupled to camshaft 130. By manipulation of the hydraulic coupling as described herein, the relative position of camshaft 130 to crankshaft 40 can be varied by hydraulic pressures in retard chamber 142 and advance chamber 144. By allowing hydraulic fluid to enter retard chamber 142 while simultaneously allowing oil to exit advance chamber 144, the relative relationship between camshaft 130 and crankshaft 40 is retarded. Thus, intake valves 52a, 52b and exhaust valves 54a, 54b open and close at a time later than normal relative to crankshaft 40. Similarly, by allowing hydraulic fluid to enter advance chamber 144 while simultaneously allowing oil to exit retard chamber 142, the relative relationship between camshaft 130 and crankshaft 40 is advanced. Thus, intake valves 52a, 52b, and exhaust valves 54a, 54b open and close at a time earlier than normal relative to crankshaft 40.

While this example shows a system in which the intake and exhaust valve timing are controlled concurrently, variable intake cam timing, variable exhaust cam timing, dual independent variable cam timing, dual equal variable cam timing, or other variable cam timing may be used. Further, variable valve lift may also be used. Further, camshaft profile switching may be used to provide different cam profiles under different operating conditions. Further still, the valve-train may be roller finger follower, direct acting mechanical bucket, electrohydraulic, or other alternatives to rocker arms.

Continuing with the variable cam timing system, teeth 138, rotating synchronously with camshaft 130, allow for measurement of relative cam position via cam timing sensor 150 providing signal VCT to controller 12. Teeth 1, 2, 3, and 4 may be used for measurement of cam timing and are equally spaced (for example, in a V-8 dual bank engine, spaced 90 degrees apart from one another) while tooth 5 may be used for cylinder identification. In addition, controller 12 sends control signals (LACT, RACT) to conventional solenoid valves (not shown) to control the flow of hydraulic fluid either into retard chamber 142, advance chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification. Alternate tooth patterns are possible including patterns with teeth of unequal thickness.

As described above, FIG. 2 merely shows one cylinder of a multi-cylinder engine, and it will be appreciated that each cylinder has its own set of intake/exhaust valves, fuel injectors, spark plugs, etc.

FIG. 7 depicts the effect of cam torsionals on phaser motion. Specifically, FIG. 7 depicts a single-lobe cam 706 in two different states. On the left, at 700, cam 706 is shown subjected to retarding cam torsion 708, while on the right, at 750, the cam is shown subjected to advancing cam torsion 712. At 700, as the clockwise rotational motion 710 of cam 706 pushes valve 702 upward, retarding cam torsion 708 is imparted onto the cam by the resisting force of spring 704. Similarly, at 750, after the angular position of cam 706 passes the point of maximum spring compression, spring 704 imparts advancing cam torsion 712 upon the cam as the spring decompresses and valve 702 moves downward.

FIG. 3 shows example torsional signature maps 300, 350 generated on one bank of an engine. In the depicted example, the engine is a V8 engine with a single overhead cam (SOHC) wherein a single camshaft controls the operation of each of intake and exhaust valves of 4 cylinders of a given bank. Herein, both the intake and exhaust valve mechanisms are providing torque to the camshaft. Each map depicts a torque applied on the camshaft along the y-axis relative to engine position/timing (in crank angle degrees). As such, in the V8 engine, cylinders may be numbered 1-4 along a first engine bank and numbered 5-8 along a second engine bank. When all cylinders are active, the engine may operate with the cylinder firing order 1-3-7-2-6-5-4-8.

Map 300 depicts an example torsional signature produced with all 4 cylinders of the first bank active. Herein, the engine is operating with no cylinder deactivation. As shown, the torsional signature includes three distinct positive and three distinct negative peaks to apply torque to the cam phaser. As such, the sum of the torque peaks generates sufficient energy for camshaft phasing.

In comparison, map 350 depicts an example torsional signature produced with one cylinder (specifically cylinder_2) of the first bank deactivated. Herein, the engine is operating with one cylinder of the first bank deactivated and remaining 3 cylinders (cylinders_1, 3, 4) active. As shown, when cylinder_2 is deactivated, the torsional signature still includes three distinct positive and three distinct negative peaks to apply torque to the cam phaser. However, the magnitude of two of the peaks is diminished. As a result, the sum of the torque peaks generates less energy that may be insufficient for camshaft phasing at a desired rate.

FIG. 4 shows example torsional signature maps 410, 420, 460, 470 generated on one bank of a V8 engine with a single overhead cam (SOHC). Therein a single camshaft controls the operation of each of intake and exhaust valves of 4 cylinders of a given bank and both the intake and exhaust valve mechanisms are providing torque to the camshaft. Each map depicts a torque applied on the camshaft along the y-axis relative to engine position/timing (in crank angle degrees). As such, in the V8 engine, cylinders may be numbered 1-4 along a first engine bank and numbered 5-8 along a second engine bank. When all cylinders are active, the engine may operate with the cylinder firing order 1-3-7-2-6-5-4-8.

Maps 410, 420 belong to a first group 400 while maps 460, 470 belong to a second group 450. In particular, the first group 400 includes maps of torsional signatures, generated with one cylinder of the bank deactivated, where the resulting torque peaks are favorable for cam phasing. In comparison, the second group 450 includes maps of torsional signatures, generated with one cylinder of the bank deactivated, where the resulting torque peaks are not favorable for cam phasing.

Map 410 depicts an example torsional signature produced with cylinder_1 of the first bank deactivated while map 420 depicts an example torsional signature produced with cylinder_3 of the first bank deactivated. In both cases, the torsional signature includes three distinct positive and three distinct negative peaks of sufficient magnitude (and amplitude) such that enough torque can be applied to the cam phaser. As a result, these cylinder deactivation patterns may be considered favorable during a cam phasing request since the sum of the torque peaks generates enough energy for camshaft phasing.

Map 460 depicts an example torsional signature produced when cylinder_2 of the first bank is deactivated while map 470 depicts an example torsional signature produced when cylinder_4 of the first bank is deactivated. In both cases, the torsional signature includes three distinct positive and three distinct negative peaks but at least two of the peaks are of lower magnitude (and amplitude) such that enough torque cannot be applied to the cam phaser. As a result, these cylinder deactivation patterns may be considered unfavorable during a cam phasing request since the sum of the torque peaks generates lower energy than needed for proper camshaft phasing.

In one example, an engine may be operating with one cylinder deactivated, and specifically with either cylinder_2 or cylinder_4 deactivated (and remaining engine cylinders of the bank, including cylinder_1 and cylinder_3 active) due to a reduced driver torque demand. In response to a camshaft phasing request received while cylinder_2 or cylinder_4 is deactivated, an engine controller may reactivate cylinder_2 or cylinder_4. In addition, if cylinder deactivation conditions are still met, the controller may deactivate one of cylinder_1 and cylinder_3 to allow the cylinder deactivation benefits to be achieved while providing a torsional signature that is more favorable for camshaft phasing.

FIG. 5 shows example torsional signature maps 510, 520, 550 generated on one bank of a V8 engine with a single overhead cam (SOHC). Therein a single camshaft controls the operation of each of intake and exhaust valves of 4 cylinders of a given bank and both the intake and exhaust valve mechanisms are providing torque to the camshaft. Each map depicts a torque applied on the camshaft along the y-axis relative to engine position/timing (in crank angle degrees). As such, in the V8 engine, cylinders may be numbered 1-4 along a first engine bank and numbered 5-8 along a second engine bank. When all cylinders are active, the engine may operate with the cylinder firing order 1-3-7-2-6-5-4-8.

Maps 510, 520 belong to a first group 500 while map 550 belong to a second group. In particular, the first group 500 includes maps of torsional signatures, generated with two cylinders of the bank deactivated, where the resulting torque peaks are favorable for cam phasing. In comparison, the second group includes a map 550 of torsional signatures, generated with two cylinders of the bank deactivated, where the resulting torque peaks are not favorable for cam phasing.

Map 510 depicts an example torsional signature produced with cylinders_1 and 2 of the first bank deactivated while map 520 depicts an example torsional signature produced with cylinders_3 and 4 of the first bank deactivated. In both cases, the torsional signature includes three distinct positive and three distinct negative peaks of sufficient magnitude (and amplitude) such that enough torque can be applied to the cam phaser. As a result, these cylinder deactivation patterns may be considered favorable during a cam phasing request since the sum of the torque peaks generates enough energy for camshaft phasing.

Map 550 depicts an example torsional signature produced with cylinders_2 and 4 of the first bank deactivated. Here, the torsional signature includes only two distinct positive and negative peaks, and further the two peaks are of lower magnitude (and amplitude) such that enough torque cannot be applied to the cam phaser. As a result, this cylinder deactivation pattern may be considered unfavorable during a cam phasing request since the sum of the torque peaks generates lower energy than needed for proper camshaft phasing.

In one example, an engine may be operating with two cylinders deactivated, and specifically with each of cylinder_2 and cylinder_4 deactivated (and remaining engine cylinders of the bank, cylinder_1 and cylinder_3, active) due to a reduced driver torque demand. In response to a camshaft phasing request received while cylinders_2 and 4 are deactivated, an engine controller may reactivate at least one of cylinder_2 and cylinder_4. In addition, if cylinder deactivation conditions are still met, the controller may reactivate either cylinder_1 or cylinder_3 to allow either cylinder_1 and 2, or cylinders_3 and 4 to be deactivated. This allows cylinder deactivation benefits to be achieved while providing a torsional signature that is more favorable for camshaft phasing.

It will be appreciated that while the examples of FIGS. 3-5 are depicted with reference to a V8 engine with SOHC configuration, wherein both the intake and exhaust valve mechanisms are providing torque to the camshaft, the concept may be similarly applied to V8 engines with dual overhead camshafts (DOHC) wherein a first camshaft controls the operation of intake valves of 4 cylinders of a given bank and a second camshaft controls the operation of exhaust valves of 4 cylinders of the given bank. Therein, one of the intake and exhaust valve mechanisms may be providing torque to a corresponding camshaft. Further, the concept may be similarly extended to other engines such as in-line engines (e.g., an I4 engine), V-engines with a larger or smaller number of cylinders (e.g., a V6 or V10 engine), or engines with pushrod valve-trains (OHV). In each case, the cylinder pattern may be selected based on torsional signatures which may be empirically determined and/or modeled based on specific engine operating parameters such as cylinder firing order. In each case, based on the firing order and expected/actual torsional force imparted by the valve-train on the camshaft, the controller may determine whether to reactivate a currently deactivated cylinder and/or deactivate a currently active cylinder in response to a phasing request.

Figure 6:
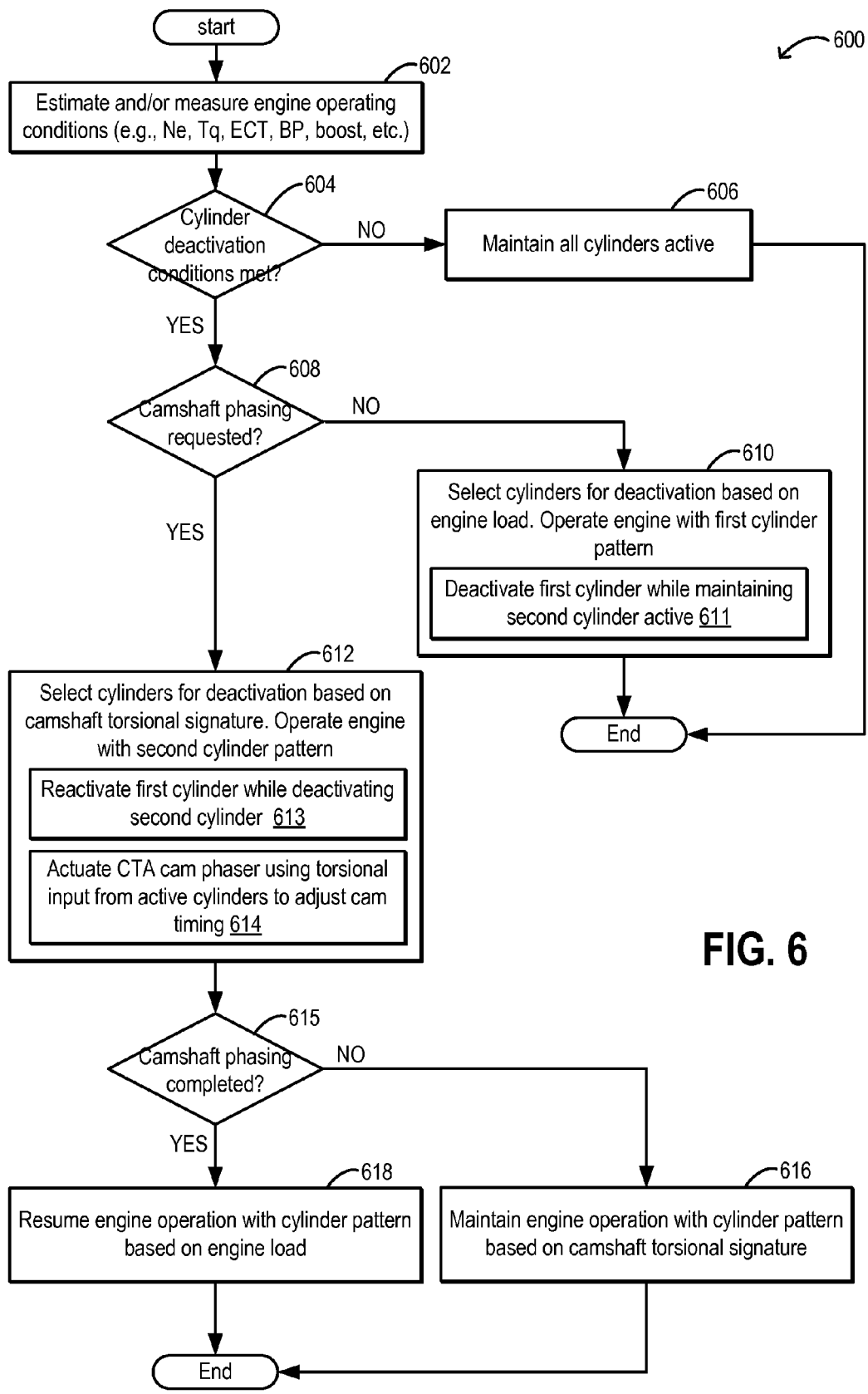
FIG. 6 shows a high level flow chart for adjusting operation of individual cylinder valve mechanisms to deactivate/reactivate engine cylinders responsive to a camshaft phasing request.

Now turning to FIG. 6, an example routine 600 is shown for adjusting cylinder deactivation/reactivation responsive to a cam phasing request to improve phasing efficiency. Instructions for carrying out method 600 may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, such as the actuators described above with reference to FIGS. 1 and 2, according to the methods described below.

At 602, engine operating conditions may be estimated and/or measured. These may include, for example, engine speed, engine temperature, driver torque demand, boost level, ambient conditions such as barometric pressure, ambient humidity, ambient temperature, etc. At 604, it may be determined if cylinder deactivation conditions have been met. In one example, cylinder deactivation conditions may be considered met when driver torque demand is lower than a threshold. If cylinder deactivation conditions are not met, at 606, all the engine cylinders may be maintained active.

If cylinder deactivation conditions are met, at 608, it may be determined if a camshaft phasing request has been received. In one example, camshaft phasing may be requested to advance or retard cam timing. Cam timing may be advanced or retarded to adjust valve timing of intake and/or exhaust valves. If camshaft phasing is not requested, at 610, the engine controller may select cylinders for deactivation based on engine load. Specifically, the routine includes selecting a first cylinder pattern of individual cylinder valve mechanisms for deactivation, the first cylinder pattern including a total number of deactivated/active cylinders. The first cylinder pattern may have a number of active cylinders based on engine load and further the identity of the active cylinders may be selected based on parameters such as firing order and position on engine block. In one example, one or more cylinders of a first engine bank may be deactivated while cylinders of a second engine bank continue combusting. In another example, at 611, a first cylinder may be deactivated while a second cylinder is maintained active. Further still, the first cylinder pattern may be based on the identity of cylinders that were deactivated or active during a last (that is, immediately previous) cylinder deactivation condition. For example, the identity of cylinders that are deactivated on successive deactivation events may be rotated. The engine controller may refer to a look-up table stored in the controller's memory to determine the cylinder pattern, the look-up table including cylinder patterns stored as a function of engine load for the given engine's cylinder configuration. The engine may then be operated with the selected first cylinder pattern.

If a camshaft phasing request has been received, then at 612, the routine includes selecting cylinders for deactivation based on a camshaft torsional signature of the cylinder patterns. Since the camshaft phaser depends on torsional input from valve-train members of active cylinders as energy source for advancing or retarding the cam phasing, the ability to phase may be affected by the torsional signature of the selected cylinder pattern. For example, a first cylinder pattern selected based on engine load may have fewer peaks per cycle and/or peaks of lower amplitude, while a second cylinder pattern selected based on the same engine load may have more peaks per cycle and/or peaks of higher amplitude. Herein, the first cylinder pattern, if selected, may diminish the phaser's ability for cam phasing, however, the second cylinder pattern, if selected, may improve the phaser's ability for cam phasing. Thus at 612, a second cylinder pattern that meets the engine load requirement while providing a torsional signature that is favorable for cam phasing may be selected. The engine may then be operated with the selected second cylinder pattern.

For example, the controller may compare a sum of camshaft torsion amplitudes of the one or more active engine cylinders to an estimated cam torque required for actuating the phaser. If the sum is lower than the estimated cam torque required, the controller may select one or more of the active engine cylinders for deactivation while reactivating one or more other cylinders to result in a higher sum of camshaft torsion amplitudes. In comparison, if the sum is higher than the estimated cam torque, the controller may maintain the one or more engine cylinders active.

As used herein, the controller deactivating one or more engine cylinders includes the controller sending a signal to a cylinder valve actuator to deactivate the valve, or to a cylinder fuel injector to stop fuel injection. Likewise, the controller reactivating one or more engine cylinders includes the controller sending a signal to a cylinder valve actuator to reactivate the valve, or to a cylinder fuel injector to resume fuel injection.

In one example, when cylinder deactivation conditions are met, the first cylinder pattern may be selected and the engine may be operated with a first total number of deactivated/active cylinders, the first cylinder pattern also including a first set of active cylinders. The camshaft phasing request may be received while the engine is operating with the first cylinder pattern. In response to the camshaft phasing request, the engine may be transitioned from the first cylinder pattern to a second cylinder pattern having a second total number of deactivated/active cylinders, the second cylinder pattern also including a second set of active cylinders. The transitioning may include, at 613, reactivating a first cylinder that was deactivated in the first cylinder pattern to provide a more favorable torsional signature. The transitioning may further include deactivating a second cylinder that was active in the first cylinder pattern and that is deactivated in the second cylinder pattern to provide the more favorable torsional signature while also maintaining the total number of deactivated/active cylinders. In addition, the controller may adjust the cam timing with a cam torque actuated actuator and hydraulic control solenoid using the torsional input from the active cylinders of the selected cylinder pattern at 614.

At 615, it may be determined if camshaft phasing has been completed. If not, engine operation may be continued with the second cylinder pattern selected based on camshaft torsional signatures at 616. Else at 618, the routine includes resuming engine operation with the first cylinder pattern selected based on engine load. Alternatively, engine operation may be transitioned to an alternate cylinder pattern based on nominal conditions.

In one example, a method for an engine, comprises deactivating an individual cylinder valve mechanism according to a cylinder pattern; and reactivating the valve mechanism in response to a request for cam phasing. The request for cam phasing may include a request to advance or retard cam timing. The method may further comprise adjusting the cam timing with a cam torque actuated actuator. The cylinder pattern may include a total number of deactivated/active cylinders, the cylinder pattern selected responsive to engine load. The cylinder pattern may include a first and a second deactivated cylinder and a third active cylinder, and wherein reactivating the valve mechanism includes reactivating the valve mechanism of the first cylinder while maintaining the valve mechanism of the second cylinder deactivated. Reactivating the valve mechanism may further include, deactivating the valve mechanism of the third active cylinder while reactivating the valve mechanism of the first cylinder to maintain the total number of deactivated/active cylinders of the cylinder pattern.

In another example, an engine may operate in a first mode wherein in response to a request for cam phasing, an individual cylinder valve mechanism of a deactivated cylinder is reactivated. The engine may be further operated in a second mode wherein in response to a request for cam phasing, the individual cylinder valve mechanism of the deactivated cylinder is maintained deactivated. Operating in the first mode may include operating with a first cylinder deactivation pattern while operating in the second mode may include operating with a second, different cylinder deactivation pattern. The first and second cylinder deactivation patterns may each have a common total number of deactivated/active cylinders, and further a first set of cylinders of the first cylinder deactivation pattern may be distinct from a second set of cylinders of the second cylinder deactivation pattern. Operating the engine in the first mode may further include, while reactivating the individual cylinder valve mechanism of the deactivated cylinder, deactivating an individual cylinder valve mechanism of an active cylinder. The controller may select the active cylinder for deactivation during the first mode based on a timing and amplitude of camshaft torsionals generated by the active cylinder. Further, the controller may select the deactivated cylinder for reactivation during the first mode based on an expected timing and amplitude of camshaft torsionals generated by the cylinder upon reactivation.

It will be appreciated that while the above method suggests changing the cylinder pattern of deactivation responsive to a cam phasing request, in alternate examples, an engine controller may determine a number of cylinders to deactivate based on driver torque demand, and then select a cylinder pattern (of individual cylinder valve deactivation mechanisms) for the given number of deactivated cylinders so that the torsional energy is higher than a threshold. Herein, the threshold may be based on an energy required for cam phasing (e.g., an average energy required for cam phasing). As an example, for the given number of deactivated cylinders, a cylinder pattern may be selected that provides the highest (absolute) torsional energy. As another example, for the given number of deactivated cylinders, a cylinder pattern may be selected that provides the highest torsional energy relative to the threshold. As such, this allows the engine to always be operating with a cylinder deactivation pattern capable of providing the phasing, when operating with cylinder deactivation.

Now turning to FIG. 8, an example map 800 is shown depicting cylinder deactivation and reactivation responsive to a cam phasing request. Map 800 depicts cam torsional energy at plot 801, a change in cam phaser position at plot 803, the operating state (active or deactivated) of a first cylinder (Cyl_1) at plot 806, and the operating state (active or deactivated) of a second cylinder (Cyl_2) at plot 804. Example cam torsional outputs from active cylinders are depicted at 808.

It will be appreciated that the cam torsional outputs depicted at 808 are an example used to illustrate the concepts disclosed herein. As such, individual cam torsional peaks may occur more frequently than the dots depicted at 808. At 2000 RPM for instance, 3 or more peaks may occur in a span of 60 milliseconds. The cam torsional energy plot (plot 801) reflects a total energy of the multiple cam torsional outputs or peaks when an engine is operating with a given cylinder pattern.

It will be appreciated that as used herein, the first and second cylinder may represent distinct cylinders but not necessarily the cylinder number in relation to their position on an engine block. In one example, the first cylinder and the second cylinder may be cylinder_1 and cylinder_2 of a first engine bank of a V-8 engine. In another example, the first cylinder and the second cylinder may be cylinder_1 and cylinder_3 of a first engine bank of a V-8 engine. Still other combinations may be possible.

Prior to t1, the engine may be operating in a skip-fire mode with the first cylinder deactivated and the second cylinder active and combusting. In one example, prior to t1, the engine may be operating with a first cylinder pattern selected based on engine load where the first cylinder is deactivated while the second cylinder is maintained active. The first cylinder pattern may generate a torsional signature including cam torsionals 808 that are frequent and have sufficiently high amplitude. As a result of cam torsionals 808, a cam torsional energy (plot 801) prior to t1 is higher than threshold 802. As such prior to t1, a cam phasing request may not have been received.

At t1, a cam phasing request is received. The cam phasing request may be responsive to a request for advancing or retarding cam timing to thereby adjust valve timing. Due to the particular signature of cam torsionals 808 of high energy output at the first cylinder pattern (that is, cam torsionals that have a higher than threshold amplitude and a timing of the cam torsionals being synchronous with a timing of the cam phasing), the cam torsional energy may be higher than threshold 802. As a result, there may be sufficient energy available to the camshaft to meet the phasing request. Accordingly after t1, the cam phaser may be phased (advanced or retarded) using cam torsional energy from cam torsionals 808. Since the torsional signature of the first cylinder pattern is favorable for phasing, the first cylinder pattern is maintained responsive to the phasing request, during the phasing, and after the phasing.

At a later engine operation time point t2, the engine may again be operating in the skip-fire mode but with the first cylinder active and combusting and the second cylinder deactivated. In one example, at t2, the engine may be operating with a second cylinder pattern, different from the first cylinder pattern, the second pattern also selected based on engine load. The second cylinder pattern may generate a torsional signature including cam torsionals 808 that are less frequent and have lower amplitude. Herein, due to the specific signature of cam torsionals 808 at the second cylinder pattern, the cam torsional energy may be lower than threshold 802.

At t3, another cam phasing request is received. The cam phasing request may be responsive to a request for advancing or retarding cam timing to thereby adjust valve timing. Due to the presence of cam torsionals 808 of lower energy output, the cam torsional energy may be lower than threshold 802. As a result, there may be insufficient energy available to the camshaft to meet the phasing request. Herein, the cam torsionals have a lower than threshold amplitude and further a timing of the cam torsional peaks may be asynchronous or offset from a timing of the cam phasing request. Accordingly at t3, in response to the phasing request, the second cylinder may be reactivated to change the cam torsional signature and improve the torsional output energy. In addition, the first cylinder may be deactivated to maintain the total number of deactivated/active cylinders of the cylinder pattern constant. In particular, by reactivating the second cylinder and deactivating the first cylinder, the cam torsional energy may be raised above threshold 802, so that there is sufficient energy for the requested cam phasing.

After t3, the cam phaser may be phased (advanced or retarded) using the higher cam torsional energy from cam torsionals 808. As such, if the second cylinder were maintained deactivated (as shown at dotted segment 805), the resulting torsionals 810 (hatched circles) may have been infrequent and of lower energy output, and overall unfavorable for phasing. That is, the torsional energy (as shown at dashed segment 807) may have remained lower than threshold 802. Thus, due to the torsional signature of the second cylinder pattern being unfavorable for phasing, the second cylinder pattern is transitioned to a different cylinder pattern responsive to the phasing request by reactivating one or more deactivated cylinders and/or concurrently deactivating one or more active cylinders. The second cylinder pattern is then maintained during the phasing between t3 and t4.

At t4, phasing may be completed. Consequently, shortly after t4, the second cylinder pattern may be resumed by reactivating the first cylinder and deactivating the second cylinder. The cam torsional energy may correspondingly change. In this way, a cylinder deactivation pattern may be adjusted responsive to a cam phasing request based on a torsional signature of the active cylinders of the cylinder deactivation pattern.

It will be appreciated that while the above example depicts changing the cylinder pattern of deactivation responsive to a cam phasing request, in alternate examples, an engine controller may determine a number of cylinders to deactivate based on driver torque demand, and then select a cylinder pattern (of individual cylinder valve deactivation mechanisms) for the given number of deactivated cylinders so that the torsional energy is higher than a threshold, where the threshold is based on an energy required for cam phasing (e.g., an average energy required for cam phasing). For example, the controller may choose a pattern that has the highest torsional energy so that further cylinder pattern adjustments are not required when cam phasing is commanded. In other words, when operating with cylinder deactivation, the engine would always be operating with a cylinder deactivation pattern capable of providing the phasing. Herein, the controller may deactivate a cylinder pattern of one or more engine cylinders responsive to a driver demand, and select the one or more engine cylinders of the cylinder pattern for deactivation based on a (total or net) cam torsional energy of the individual peaks of the cylinder pattern. The selecting may include selecting the one or more cylinders so that the cam torsional energy is higher than a threshold, the threshold based on an energy (e.g., average) requirement of a cam phaser.

One example method for an engine comprises: deactivating an individual cylinder valve mechanism according to a cylinder pattern; and reactivating the valve mechanism in response to a request for cam phasing. In the preceding example, the request for cam phasing may additionally or alternatively include a request to advance or retard cam timing, and the reactivation may additionally or alternatively be is in response to the request being a request to advance and/or retard cam phasing from a current cam phasing. Any or all of the preceding example methods may additionally or alternatively further comprise adjusting the cam timing with a cam torque actuated actuator. In any or all of the preceding example methods, the cylinder pattern may additionally or alternatively include a total number of deactivated/active cylinders. In any or all of the preceding example methods, the cylinder pattern may be additionally or alternatively selected responsive to engine load. In any or all of the preceding example methods, the cylinder pattern may additionally or alternatively include a first and a second deactivated cylinder and a third active cylinder, wherein reactivating the valve mechanism includes reactivating the valve mechanism of the first cylinder while maintaining the valve mechanism of the second cylinder deactivated. In any or all of the preceding example methods, reactivating the valve mechanism may additionally or alternatively include deactivating the valve mechanism of the third active cylinder while reactivating the valve mechanism of the first cylinder to maintain a total number of deactivated/active cylinders of the cylinder pattern.

Another example method may comprise: operating an engine in a first mode wherein in response to a request for cam phasing, an individual cylinder valve mechanism of a deactivated cylinder is reactivated; and operating the engine in a second mode wherein in response to a request for cam phasing, the individual cylinder valve mechanism of the deactivated cylinder is maintained deactivated. In the preceding example, operating in the first mode may additionally or alternatively include operating with a first cylinder deactivation pattern and operating in the second mode may include operating with a second, different cylinder deactivation pattern. In any or all of the preceding examples, the first and second cylinder deactivation patterns may additionally or alternatively each have a common total number of deactivated/active cylinders, wherein a first set of cylinders of the first cylinder deactivation pattern is distinct from a second set of cylinders of the second cylinder deactivation pattern. In any or all of the preceding examples, operating the engine in the first mode may additionally or alternatively include, while reactivating the individual cylinder valve mechanism of the deactivated cylinder, deactivating an individual cylinder valve mechanism of an active cylinder. Any or all of the preceding examples may additionally or alternatively further comprise selecting the active cylinder for deactivation during the first mode based on a timing and amplitude of camshaft torsionals generated by the active cylinder. In any or all of the preceding examples, selecting based on a timing and amplitude of camshaft torsionals generated by the active cylinder may additionally or optionally include selecting based on one or more of an amplitude of the camshaft torsionals generated by the active cylinder being lower than a threshold and a timing of the camshaft torsionals generated by the active cylinder being offset from a timing of the cam phasing. Any or all of the preceding examples may additionally or alternatively further comprise selecting the deactivated cylinder for reactivation during the first mode based on an expected timing and amplitude of camshaft torsionals generated by the deactivated cylinder upon reactivation.

An example engine system may comprise: an engine having a plurality of cylinders, each cylinder including at least one cylinder valve; a deactivation mechanism for deactivating the at least one cylinder valve of at least one of the plurality of cylinders; a cam coupled to one or more cylinder valves, the cam coupled to a camshaft; a variable cam timing mechanism for adjusting a timing of the one or more cylinder valves, the mechanism including a cam-torque actuated phaser coupled to the camshaft; and a controller. The controller may be configured with computer-readable instructions stored on non-transitory memory for: deactivating at least one cylinder valve for a number of engine cylinders based on engine load, while maintaining remaining engine cylinders active; and in response to a request for actuating the phaser, deactivating at least one cylinder valve for one or more active engine cylinders while reactivating the at least one cylinder valve for one or more of the number of deactivated engine cylinders. In the preceding example system, the controller may additionally or alternatively include further instructions for: selecting the one or more active engine cylinders for deactivation based on camshaft torsions of the active cylinders; and selecting the one or more of the number of deactivated engine cylinders for reactivation based on camshaft torsions of the reactivated cylinders. In any or all of the preceding examples, the controller may additionally or alternatively include further instructions for comparing a sum of camshaft torsion amplitudes of the one or more active engine cylinders to an estimated cam torque required for actuating the phaser; if the sum is lower than the estimated cam torque, selecting the one or more active engine cylinders for deactivation; and if the sum is higher than the estimated cam torque, maintaining the one or more engine cylinders active. In any or all of the preceding example systems, the controller may additionally or alternatively include further instructions for estimating a cam torque required based on the request for actuating the phaser; and selecting the one or more of the number of deactivated engine cylinders for reactivation based on a sum of camshaft torsions of the reactivated cylinders relative to the estimated cam torque. In any or all of the preceding example systems, the controller may additionally or alternatively include further instructions for comparing a sum of camshaft torsion amplitudes of the one or more deactivated engine cylinders upon reactivation to the estimated cam torque; and if the sum is higher than the estimated cam torque, reactivating the one or more deactivated engine cylinders. In any or all of the preceding example systems, the request for actuating the phaser may additionally or alternatively include a request to advance or retard the phaser from a current phasing, the phaser advanced or retarded to advance or retard a cylinder valve timing.

In a further representation, an example method for an engine comprises: deactivating individual cylinder valve mechanisms according to a first cylinder pattern having a total number of deactivated/active cylinders; and in response to a camshaft phasing request, transitioning to a second cylinder pattern by reactivating a deactivated cylinder while deactivating an active cylinder of the first cylinder pattern. In the preceding example, the first cylinder pattern is additionally or alternatively selected based on engine load, and the second cylinder pattern is selected based on the engine load and further based on a camshaft torsional signature of active cylinders in the second cylinder pattern. In any or all of the preceding examples, the method may additionally or alternatively further comprise selecting the deactivated cylinder for reactivation based on a camshaft torsional output of the cylinder, the camshaft torsional output including one or more of a camshaft torsional amplitude and timing. In any or all of the preceding examples, the method may additionally or alternatively further comprise selecting the active cylinder for deactivation based on a camshaft torsional output of the cylinder, the camshaft torsional output including one or more of a camshaft torsional amplitude and timing.

In another further representation, an example method may comprise, in response to a camshaft phasing request, selecting a number of engine cylinders for deactivation based on engine load; and selecting an identity of the engine cylinders selected for deactivation based on camshaft torsions. For example, the engine controller may use a lookup table that includes a torsional energy parameter for each of the possible active cylinder patterns. There may be a relatively small number of possibilities, so this may be less computationally intensive.

In yet another representation, a method for an engine comprises: deactivating a cylinder pattern of one or more engine cylinders responsive to a driver demand; and selecting the one or more engine cylinders of the cylinder pattern for deactivation based on a cam torsional energy of the cylinder pattern. In the preceding example, the selecting includes selecting the one or more cylinders so that the cam torsional energy is higher than a threshold, the threshold based on an energy requirement of a cam phaser.

The technical effect of reactivating a deactivated engine cylinder in response to a cam phasing request is that the torsional input from the valve-train members of active cylinders on a cam torque actuated phaser is improved. As a result, camshaft phasing speed may be improved while operating with one or more deactivated engine cylinders. By adjusting a cylinder deactivation pattern based on the torques imparted on the camshaft from each valve of the engine cylinders, the torsional signature applied on the camshaft while selected individual cylinder valve mechanisms are deactivated is improved. Overall, camshaft phasing is improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
    deactivating one or more individual cylinder valve mechanisms according to a cylinder pattern; and
    reactivating one or more individual cylinder valve mechanisms in response to a request for a cam phasing,
    the cylinder pattern including a first and a second deactivated cylinder and a third active cylinder, wherein reactivating one or more individual cylinder valve mechanisms includes reactivating the individual cylinder valve mechanism of the first cylinder while maintaining the individual cylinder valve mechanism of the second cylinder deactivated.

2. The method of claim 1, wherein the request for cam phasing includes a request to advance or retard cam timing, and wherein the reactivation of the one or more individual cylinder valve mechanisms is in response to the request being a request to advance and/or retard cam phasing from a current cam phasing.

3. The method of claim 1, further comprising adjusting the cam phasing with a cam torque actuated actuator.

4. The method of claim 1, wherein the cylinder pattern includes a total number of deactivated/active cylinders.

5. The method of claim 1, wherein the cylinder pattern is selected responsive to an engine load.

6. The method of claim 1, wherein reactivating the one or more individual cylinder valve mechanisms further includes deactivating the individual cylinder valve mechanism of the third active cylinder while reactivating the individual cylinder valve mechanism of the first cylinder to maintain a total number of deactivated/active cylinders of the cylinder pattern.

7. A method, comprising:
    operating an engine in a first mode with a first cylinder deactivation pattern wherein, in response to a first request for a cam phasing, an individual cylinder valve mechanism of a deactivated cylinder is reactivated;
    operating the engine in a second mode with a second, different cylinder deactivation pattern wherein, in response to a second request for a cam phasing, an individual cylinder valve mechanism of a deactivated cylinder is maintained deactivated;
    wherein the first and second cylinder deactivation patterns each has a common total number of deactivated/active cylinders, and wherein a first set of cylinders of the first cylinder deactivation pattern is distinct from a second set of cylinders of the second cylinder deactivation pattern;
    wherein operating the engine in the first mode further includes, while reactivating the individual cylinder valve mechanism of the deactivated cylinder, deactivating an individual cylinder valve mechanism of an active cylinder; and
    selecting the active cylinder for deactivation during the first mode based on at least one of a timing and an amplitude of camshaft torsionals generated by the active cylinder.

8. The method of claim 7, wherein selecting based on at least one of a timing and an amplitude of camshaft torsionals generated by the active cylinder includes selecting based on at least one of the amplitude of the camshaft torsionals generated by the active cylinder being lower than a threshold and the timing of the camshaft torsionals generated by the active cylinder being offset from a timing of the cam phasing.

9. The method of claim 7, further comprising selecting the deactivated cylinder for reactivation during the first mode based on an expected timing and amplitude of camshaft torsionals generated by the deactivated cylinder upon reactivation.

10. A method for an engine, comprising:
deactivating an individual cylinder valve mechanism according to a cylinder pattern, and reactivating the individual cylinder valve mechanism via a cam-torque actuated phaser coupled to a camshaft in response to a request for a cam phasing and a required cam torque for the cam phasing.

11. The method of claim 10, wherein reactivating the individual cylinder valve mechanism via the cam-torque actuated phaser comprises actuating the cam-torque actuated phaser.

12. The method of claim 10, further comprising estimating the cam torque required in response to the request for a cam phasing.

13. The method of claim 12, further comprising selecting a deactivated cylinder for reactivation based on a sum of camshaft torsion amplitudes of reactivated cylinders relative to an estimated cam torque.

14. The method of claim 13, further comprising selecting an active cylinder for deactivation based on a sum of camshaft torsion amplitudes of active cylinders relative to the estimated cam torque.

15. The method of claim 14, further comprising comparing the sum of camshaft torsion amplitudes of the active cylinders to the estimated cam torque and selecting the active cylinder for deactivation based on the sum of camshaft torsion amplitudes of the active cylinders being lower than the estimated cam torque.

16. The method of claim 14, further comprising comparing the sum of camshaft torsion amplitudes of the active cylinders to the estimated cam torque and maintaining activation of the active cylinder based on the sum of camshaft torsion amplitudes of the active cylinders being higher than the estimated cam torque.

* * * * *